United States Patent [19]

Ellis

[11] Patent Number: 4,723,569

[45] Date of Patent: Feb. 9, 1988

[54] LOCK MECHANISMS

[75] Inventor: Alan E. H. Ellis, Colchester, England

[73] Assignee: Ellis (Colchester) Limited, England

[21] Appl. No.: 938,568

[22] Filed: Dec. 5, 1986

[30] Foreign Application Priority Data

Dec. 9, 1986 [GB] United Kingdom ............... 8530315

[51] Int. Cl.$^4$ ............................................. F16K 35/00
[52] U.S. Cl. ..................................... 137/385; 70/176;
70/178; 70/179; 70/339; 251/292
[58] Field of Search .................. 137/385; 70/176, 178,
70/179, 339, 337; 251/292

[56] References Cited

U.S. PATENT DOCUMENTS 1,910,899  5/1933  Hoof ..................................... 137/385
4,471,801  9/1984  Lange ..................................... 70/179

FOREIGN PATENT DOCUMENTS 2168131  6/1986  United Kingdom ................ 137/385

*Primary Examiner*—A. Michael Chambers
*Attorney, Agent, or Firm*—Edward R. Weingram

[57] ABSTRACT

A lock mechanism for a rotatable stub such as the operating shaft of a fluid flow control valve has a main body 10 connected to a drive member 12 adapted for mounting on the rotatable stub. A locking sleeve 17 is adapted to fit closely to the machine (e.g. valve) on which the mechanism is fitted so as to be held against rotation, and mounted in the body are two key-operated lock members 25 engageable with the sleeve 17 to lock the body against rotation. Associated with each lock member 25 is a control plate 56, movement of which can be blocked by a stop member 53 so preventing operation of the associated lock member 25. The two stop members 53 are threaded on studs 55 fixed in the body 10, and are moved linearly on being rotated by respective toothed wheels 46, driven by a peg 62 on sleeve 17 as the body 10 is rotated.

The lock mechanism is especially suitable for use on a valve having a multi-turn operating shaft, and is arranged so that both keys must be present and the associated lock members 25 released from the sleeve 17 before the valve may be operated. Moreover the mechanism may not be locked nor a key released when the valve is at an intermediate setting.

16 Claims, 3 Drawing Figures

LOCK MECHANISMS

FIELD OF THE INVENTION

This invention relates to a lock mechanism suitable for locking a rotatable stub (such as a multi-turn fluid flow control valve operating member) projecting from a machine element (such as a valve body).

BACKGROUND TO THE INVENTION

In the case of an industrial installation, it is frequently necessary to provide a means for locking a rotatable operating member, either to secure that operating member against unauthorised operation or to prevent its operation other than a the correct point in a sequence of other associated operations. For example, fluid-flow control valves often have to be secured in this way.

A valve operating member may be secured against unauthorised operation by a simple chain or padlock but more recently there have been proposals for much more sophisticated mechanisms adapted for mounting on a valve, preferably without the need to modify the valve body in any way. Such a mechanism typically is key-operated and arranged so that the key must be inserted to permit operation of the valve. Moreover, the key usually is held trapped until the mechanism is locked to prevent valve operation, and such locking ordinarily is possible only when the valve has been operated to some pre-determined setting—notionally either one or both of fully opened or fully closed. It is usual to refer to such an arrangement as a "lock mechanism".

When security is required to prevent a valve being operated out of turn within a pre-determined sequence of a plurality of valve operations, there have been proposals for so-called "interlock mechanisms", where two separate keys must both be engaged with a lock mechanism in order to allow the valve to be operated. The arrangement should be such that both keys must be present in the lock mechanism to permit valve operation and are held trapped until the valve has been set to one of its two possible extreme settings: one or the other key then may be removed depending upon which extreme setting has been reached. Sequencing of the valve operations may be obtained by arranging for the key which is removable at one extreme setting to be used in another similar interlock mechanism to permit operation of the valve fitted with that similar interlock, and so on.

It is relatively simple to design a lock mechanism or an interlock mechanism which is compact and efficient in its operation where the valve operating member has to be turned through a relatively small angle, from one extreme setting to the other—for example, 90' in the case of a ball valve. When however a lock mechanism or interlock mechanism is to be fitted to a valve the operating member of which requires a considerable number of turns to take the valve from one extreme setting to the other, then there are considerable problems in designing a mechanism which is able to operate in a satisfactory manner. In particular, steps must be taken to prevent the possibility of locking the mechanism at the same angular position on each turn of operating movement. The mechanism thus tends to become rather bulky, in order to accommodate the amount of movement required to take the valve from one setting to the other, and, particularly in the case of a rising-stem valve, the mechanism must provide adequate clearance for the rising stem itself. In addition, to allow one key or the other to be released at an extreme setting, the mechanism needs careful calibration and setting-up, including the machining of certain internal components to parameters determined by the valve characteristics to suit the precise number of turns required to take the valve from one extreme setting to the other. This however takes no account of the wear which inevitably occurs with a valve; thus, though the mechanism may function correctly when first installed, it may cease to function and may require the provision of replacement parts in order to allow its continued use on a valve after a period of service.

OBJECTS OF THE INVENTION

It is a principal object of the present invention to provide a lock mechanism suitable for attachment to a multi-turn rotatable stub (such as a valve operating member) projecting from a machine element (such as a valve body), which lock mechanism at least reduces the difficulties discussed above of prior designs of such a mechanism.

It is another principal object of the present invention to provide an interlock mechanism suitable for attachment to a multi-turn rotatable stub (such as a valve operating member) projecting from a machine element (such as a valve body), which interlock mechanism at least reduces the difficulties discussed above of prior designs of such a mechanism.

It is a further object of the invention to provide a lock (or interlock) mechanism suitable for use on a fluid-flow control valve, the operating member of which requires a plurality of turns to take the valve from one extreme setting to the other, which mechanism may be locked only when the valve has been turned to one or other of its extreme settings.

Yet another object is to provide a lock (or interlock) mechanism the action of which is controlled by removable keys, wherein a key is held captive by the mechanism until such time as the mechanism has been securely locked by use of the key, so that possession of a removable key indicates that a valve has been turned to a particular setting—either fully open or fully closed, as appropriate.

A further object of this invention is to provide a valve interlock mechanism, which readily is adjustable to suit a wide variety of valves all requiring different numbers of turns to take the valves from fully open to fully closed, no internal modifications or machining being necessary to the mechanism to ensure the proper operation thereof.

SUMMARY OF THE INVENTION

In accordance with the foregoing and other objects, a lock mechanism for a rotatable stub projecting from a machine element comprises:
a drive member associated with the rotatable stub;
a sleeve surrounding the drive member and held against rotation with respect to the machine element;
a main body adapted for rotation with respect to the machine element and connected to the drive member to effect rotation thereof;
lock means comprising a lock member mounted in the main body and movable between a first position in which the lock member is engaged with the sleeve so as to prevent rotation of the main body and a second position in which the lock member is free of the sleeve;

key means engageable with the lock member for moving the lock member between its two said positions;

stop means associated with the lock means to prevent operation of the lock member by the key means other than when the drive member is at a predetermined setting, which stop means comprises:

a toothed wheel rotatably mounted in the main body for cooperation with the sleeve whereby the toothed wheel is turned as the main body is rotated;

a control member mounted on the main body to control movement of the lock member; and a stop member which is moved into or out of engagement with the control member by turning movement of the toothed wheel; and the arrangement being such that when the drive member has been turned away from said predetermined setting, the consequent turning movement of the toothed wheel from it position at said predetermined setting causes the stop member to be moved to engage the control member so inhibiting movement of the lock member by the key means.

BRIEF DESCRIPTION OF THE DRAWINGS

In order that the invention may better be understood, it will now be described in greater detail and two specific constructional embodiments thereof will be given, reference being made to the accompanying drawings. In the drawings.

DESCRIPTION OF THE PREFERRED EMBODIMENTS

Figure 1:
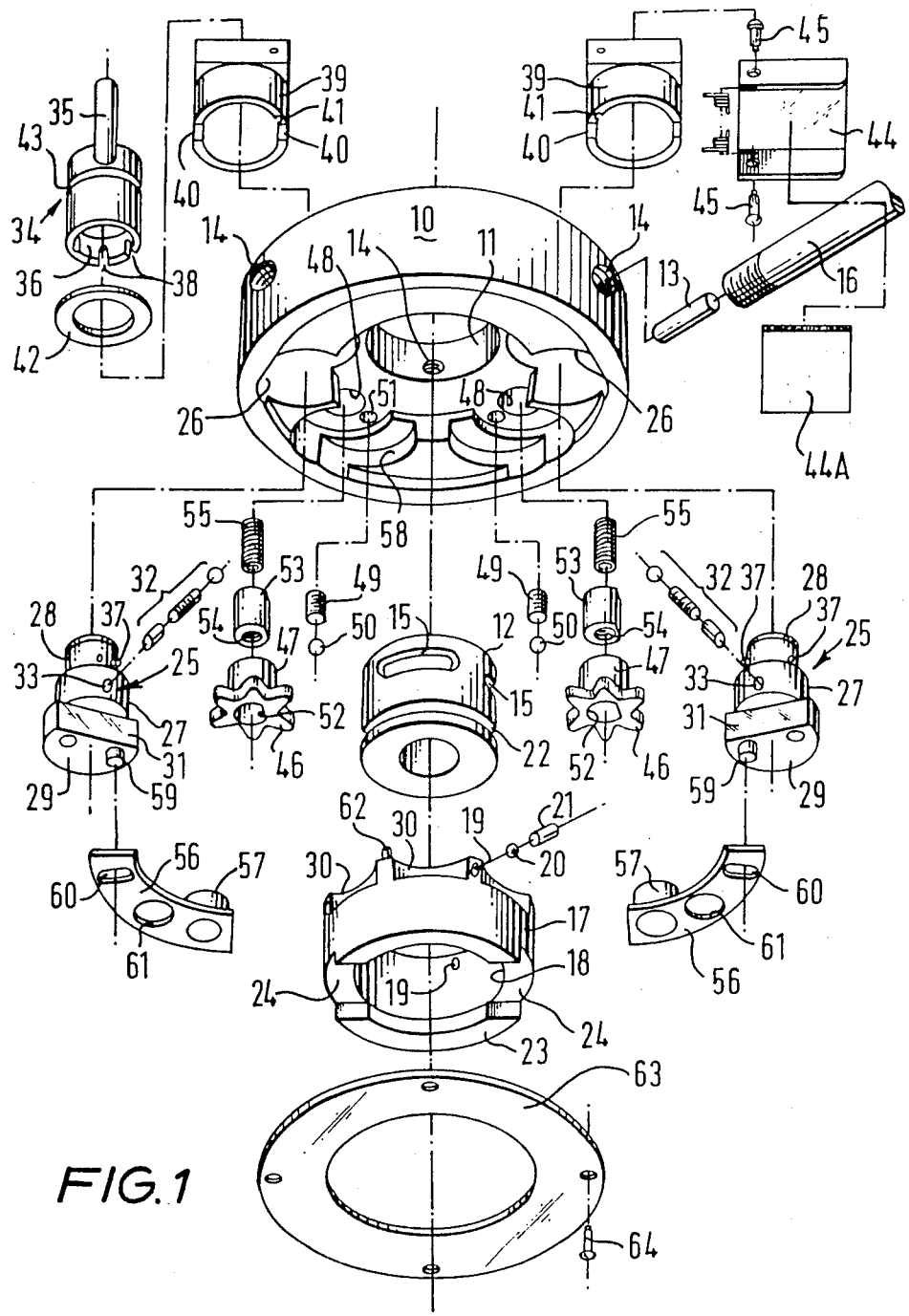
FIG. 1 is an exploded view of an interlock mechanism of this invention, for fitting to a multi-turn gear box valve.

Through the lock mechanism of this invention as described above could be used for locking a rotatable stub against rotation with respect to the machine element from which that stub projects, irrespective of the nature of the machine element and the function performed by rotation of the rotatable stub, the lock mechanism of this invention does find a particular application in the locking of a valve operating member of a multi-turn fluid-flow control valve such as a rising-stem valve or a gear box valve. Consequently, the invention will hereinafter be described in greater detail referring solely to such valves, but it is to be understood that the invention is not limited to a lock mechanism expressly for this purpose.

Most preferably, the lock mechanism of this invention is configured to permit its fitting to an existing valve without the need to modify the valve body and operating member: typically all that is necessary is for the conventional valve handle to be removed and the lock mechanism mounted instead on the operating member, using a security nut or the like to prevent unauthorised removal of the mechanism.

The preferred configuration for the lock mechanism of this invention is to have the key means held captive within the main body other than when the lock member has been engaged with the sleeve so as to prevent rotation of the main body; possession of key thus indicates that the valve cannot be operated away from its setting at which it has been locked. The arrangement should further be such that the lock member can be moved to engage the sleeve only when the valve is at a chosen extreme setting—either fully open or fully closed, this being achieved by having the toothed wheel moving the stop member clear of the control member just as the valve reaches its extreme setting.

The toothed wheel could engage corresponding teeth formed on the sleeve, but a greater operating range can be obtained by having the toothed wheel arranged for intermittent movement as the main body is rotated to turn the drive member. This may be achieved by providing an abutment such as a peg on the sleeve to project into the locus of the periphery of the toothed wheel as the main body is rotated, whereby the toothed wheel will be advanced by one tooth each time the toothed wheel passes the abutment. Of course, two or more such abutments may be provided on the sleeve, so altering the effective gearing between rotation of the main body and rotation of the toothed wheel, depending upon the required number of turns to take the valve from one extreme setting to the other; similarly the number of teeth on the toothed wheel also may be adjusted to suit.

The movement of the stop member resulting from the turning motion of the toothed wheel is preferably achieved by virtue of a screw-threaded connection between the toothed wheel and the stop member. For example, the toothed wheel may have a screw-threaded bore which is engaged by a correspondingly-threaded pin serving as the stop member, which pin is held against rotation with respect to the main body so that the pin will be moved along its axis as the toothed wheel rotates. The toothed wheel and control member should then appropriately be disposed one with respect to the other so that the pin may move into or out of engagement with the control member, on turning of the toothed wheel.

In an alternative construction, the screw-threaded pin may be secured within the main body, the toothed wheel as a whole being moved bodily along its own axis upon rotation of the main member and being provided with a boss which serves as the stop member. The most preferred configuration is however to mount the toothed wheel within the main body so that the wheel is held against axial movement, there being an internally screw-threaded bush disposed within the bore of the toothed wheel, which bush is slidable axially but held against rotation with respect to the toothed wheel, a screw-threaded pin being fixed within the main body and engaged with the screw-threaded bush whereby the bush will be moved axially upon rotation of the toothed wheel. The bush then may itself directly serve as the stop member, engageable with the control member to inhibit movement thereof.

The lock member may be formed as a cam, the lobe of which is engageable in a recess formed in the sleeve when the sleeve and main body have the correct relative disposition. Conveniently, the cam may be defined by machining away a part of a cylindrical component forming the lock member, whereby when said machined-away portion is adjacent the sleeve, the main body may rotate about the sleeve but when the lock member has appropriately been aligned with a recess in the sleeve, the lock member may be rotated so that the remaining arcuate portion of the lock member will engage in the recess, so restraining the main body against rotation.

For a lock member which is movable between its two positions by rotation, the control member preferably is slidably mounted in the main body, for sliding movement in a plane generally perpendicular to the axis of the lock member. An eccentric on the lock member (such as a pin projecting parallel to the lock member axis but offset therefrom) may engage in a slot in the control member, so that rotation of the lock member will cause the control member to perform a sliding movement; that sliding movement may then be blocked by the stop member when the toothed wheel has been turned away from its base position.

The lock mechanism of this invention as described above may be modified in order to provide an interlock mechanism as defined hereinbefore. This may be done by mounting within the main body a second lock means and associated stop means, which second lock means and associated stop means, which second lock means and associated stop means are generally similar to the first-mentioned lock means and associated stop means, except that the two stop means operate in anti-phase to each other. The arrangement then may be such that whenever the drive member is at an intermediate position, each stop member blocks the movement of its associated control member so preventing operation of the associated lock member, but when the drive member has been turned to one extreme setting (i.e. a valve on which the mechanism is mounted either is fully opened or is fully closed), one control member no longer is blocked by its associated stop member, so permitting the associated lock member to be operated and its key freed, but at the other extreme setting, the other control member no longer is blocked by its associated stop member, so permitting the other lock member to be operated and its key freed.

In order that the two stop means may operate in anti-phase, it is preferred for each stop means to include an independent screw-threaded connection which causes movement of the stop member upon rotation of the associated toothed wheel, the screw-threaded connection of one stop means being right-handed whereas the other is left-handed. In this way, upon rotation of the two toothed wheels in the same sense, one stop member will move towards a position where it blocks movement of its associated control member, whereas the other stop member will move away from such a position.

A particular advantage stemming from the use of two similar sets of lock means and stop means in such an interlock mechanism is that the same mechanism may be used on a variety of multi-turn valves irrespective of the number of turns required to take the valve from one extreme setting to the other, without the need internally to modify the interlock mechanism. This may be achieved by turning the valve to one extreme setting, and manually turning one toothed wheel until its associated lock member is just freed. The interlock mechanism is then mounted on the valve and the valve turned to its other extreme setting by rotating the main body of the interlock mechanism; at this setting the interlock mechanism is removed and the other toothed wheel is manually turned until its associated lock member is just freed. The interlock mechanism is then re-fitted to the valve and secured in position, whereafter the interlock mechanism will function properly for the number of turns required to take the valve from one extreme setting to the other. Should wear of the valve take place, the mechanism may easily be re-adjusted once more in this manner and still function wholly satisfactorily.

When a lock mechanism or interlock mechanism of this invention is to be fitted to a multi-turn valve assembly, the sleeve preferably is machined so as closely to fit against the top-works of the valve or gear box associated therewith, in order that the sleeve may thereby be restrained against rotation. The sleeve may have a plurality of lock-member receiving recesses arranged around its outer periphery, in order that a lock member may engage in a recess at the point at which the valve reaches an extreme setting. However, since the precise point at which the valve reaches an extreme setting may vary, for example as the valve wears slightly, it is preferred for there to be a limited amount of backlash in the connection between the main body and the drive member. In this way, the valve may be fully closed or opened by rotating the main body which in turn drives the drive member, and then the main body may be turned back as far as is necessary without also turning the drive member, until the lock member may engage the nearest recess in the sleeve.

Any suitable design of key may be employed to effect movement of the associated lock member, between its two positions. For the case of a rotatable lock member, it is preferred to employ a key which fits coaxially to the lock member, the key and lock member having interengaging projections and recesses to prevent rotation of the lock member by any tool other than an appropriately-coded key. Moreover, the key arrangement should be such that the key is held trapped within the main body other than when the lock member has been turned to a position where it engages the sleeve, to prevent rotation of the main body. This conveniently may be achieved by providing a profiled recess in the bore of the main body which receives the key, the key having a projection engageable in that recess. Alternatively, the key outer surface may have an external annular groove in which a projection within the key-receiving bore of the main body may be received, there being an axially-extending slot connecting the end of the key with the groove to permit entry of the key into and removal of the key from the bore.

Actual embodiments of the invention will now be described, referring to the drawings. The interlock mechanism shown in FIG. 1 comprises a main body 10 having a bore 11 in which is rotatably mounted a drive member 12. Three drive pins 13 are located one in each of three equi-spaced radial bores 14 in the main body, each drive pin 13 being received in an elongated slot 15 in the drive member 12 and each drive pin 13 being maintained in position by a radially projecting handle 16 screw-threaded into the main body 10. Each handle 16 may, following final assembly, be secured in position within the main body 10 by any suitable means—for example by a tension pin press-fitted into a suitable bore in the main body to pass diametrically through the handle 16.

A sleeve 17 having a bore 18 is mounted on the drive member 12 such that the drive member may be turned within the sleeve. The sleeve has at least three radial bores 19 adjacent its upper end in each of which is disposed a ball 20 held in place by a spring tension pin 21; the drive member 12 has an annular groove 22 in which the balls 20 are partially received, so that the drive member may be rotated with respect to the sleeve, but is held against axial movement with respect thereto.

The lower face 23 of the sleeve 17 is appropriately machined having regard to the valve which is to be fitted with the interlock mechanism, in order that the sleeve 17 may fit closely to the valve top-works or to the gear box which is itself mounted on the valve. For example, slots 24 may be provided to receive bolt heads on the valve top-works so that when the sleeve is fitted to a valve, the sleeve 17 is held against rotation with respect to the valve. Similarly, the bore of the drive member 12 should be appropriately profiled for connection to a valve operating stub in a non-rotatable manner.

Mounted for rotation within the main body 10 are two lock members 25, each carried in a respective bore 26 in the main body parallel to the bore 11. Each lock member has a cylindrical central portion 27 by means of which the lock member is journalled in the bore 26 in the main body 10, a key receiving portion 28 and a cam portion 29, produced by machining away part of the material of the lock member 25 so that the cam portion 29 generally has a D-shape. When assembled, the cam portion of each lock member 25 lies adjacent the upper end of the sleeve 17 and that upper end of the sleeve has a plurality of arcuate recesses 30 machined therein so that any one of the recesses may receive the cam portion 29; when however both lock members 25 are turned so that their respective flats 31 of the D-shaped cam portions 29 lie next to the sleeve, the main body may be rotated about the sleeve 17.

Each lock member 25 has a detent arrangement to resist the rotation thereof away from a position where the cam portion 29 is engaged in a recess 30; this detent arrangement includes a pin, spring and ball assembly 32 provided in a bore 33 of the lock member, the ball being received in a suitable recess in the main body adjacent the bore 26.

There is provided for each lock member 25 an associated key 34 (only one of which keys is shown in FIG. 1), the key having a generally cylindrical form with a lever 35 projecting from the upper end thereof. The key has a bore 36 which may be positioned over the key-receiving portion 28 of the lock member, there being coded projections 37 on that portion 28 which projections are received in correspondingly-coded recesses 38 formed in the key. In this way, each lock member may be rotated only upon possession of the correct key.

Pressed into the upper end of each bore 26 of the main body 10 is a key entry component 39, arranged so that the outer surface of the key 34 fits closely therewithin. This key entry component 39 includes abutments 40 to limit the key angular movement when fitted therewithin, the key having a suitable projection (not shown) engageable with those abutments. The component 39 further includes an axially-extending internal groove 41 along which the projection on the key may pass, so that the key may be inserted into and removed from the component 39 only when the key has the correct angular disposition with respect to that component.

Weather-proofing of the just-described lock member and key arrangement is achieved by providing a rubber washer 42 on each key, snapped into a groove 43 therearound, and also by providing a spring-loaded cover flap 44, pivoted to the key entry component 39 by means of a pair of hammer drive screws 45. A rubber sealing plate 44A is bonded to the underside of the cover 44.

Associated with each lock member 25 is a stop arrangement, each stop arrangement including a toothed wheel 46 having a boss 47 by means of which the toothed wheel is rotatably mounted in a bore 48 in the main body. A spring 49 and a ball 50 are mounted in a further bore 51 adjacent bore 48, to serve as a detent arrangement for the toothed wheel 46 and so to resist rotation of that wheel other than when the wheel is positively driven. The boss 47 has a bore 52 of D-shaped cross section, in which is non-rotatably mounted a stop member 53 able to slide with respect to the boss, the stop member having a screw-threaded bore 54. A screw-threaded stud 55 is threaded into a correspondingly threaded bore provided at the upper end of bore 48 in the body 10 and is secured in position by any suitable means. Rotation of the toothed wheel 46 thus threads the stop member 53 along the stud 55, in a direction depending upon the sense of rotation of the toothed wheel and also on the hand of the threads.

Each stop arrangement further comprises an arcuate control plate 56, a boss 57 being rivetted to that plate and received in an arcuate recess 58 in the main body, whereby the plate 56 is located in position, lying against the end face of the cam portion 29 of the lock member 25. A pin 59 is pressed into the cam portion 29 so as to project eccentrically from the end face of the lock member 25, that pin 59 being received in a slot 60 in the control plate 56. That plate further has an aperture 61 between its boss 57 and slot 60, which aperture 61 may receive the stop member 53 when the control plate 56 is appropriately positioned.

At least one striker pin 62 is mounted on the sleeve 17, to project parallel to the axis of the sleeve and to lie in the locus of the toothed wheels 46, as the main body 10 is rotated about the sleeve 17. In this way, each time a toothed wheel 46 passes the pin 62, the toothed wheel will be turned through an angle corresponding to the pitch of the teeth. In turn, this advances the stop member 53, either to project further from or to be withdrawn back into the toothed wheel 46. The screwthreads on the two studs 55 and interengaging stop members 53 are oppositely-handed, so that the stop members 53 operate in anti-phase—that is to say, upon rotation of the main body 10 in one sense, one stop member 53 is advanced to project further whilst the other is withdrawn.

When the lock mechanism has fully been assembled, it is completed by fitting a bottom cover plate 63 over the above-described mechanisms, the cover plate 63 being held in place by means of four hammer-drive screws 64.

When assembled, the interlock mechanism may be fitted to a valve by an appropriate security means, having regard to the valve construction. For example, in the case of a gearbox valve, the lock mechanism may simply be fitted to the gearbox driving stub by means of a security nut, fitted within the drive member 12 and engaging threads provided on the gear box driving stub. As mentioned above, the bore of the drive member 12 should be adapted to suit that stub. Equally, however, the mechanism could be fitted to a rising stem valve the stem of which would pass through the drive member 12, the member being secured to the nut of the valve by suitable means.

The interlock mechanism is initially set by turning both toothed wheels 46 in the same sense to an extreme position, whereat one control plate 56 is free to pivot the other is blocked by its stop member 53 engaging the aperture 61 therein. The valve also is turned to an extreme setting and the interlock mechanism fitted thereto. Using the handles 16, the main body 10 is turned so as to drive the valve to its other extreme setting, whereat both control plates 56 should be blocked, provided that the number of turns required to operate the valve does not exceed a design value for the interlock mechanism. After removal of the interlock mechanism from the valve, the other toothed wheel (that is, the toothed wheel associated with the control plate which was blocked at the first extreme setting of the valve) is turned until the associated control plate is freed. Thereafter, the keys are fitted into the interlock mechanism and that mechanism is finally fitted to the valve.

From this point, the valve may be operated only when both keys are present and both lock members 25 are turned to release their cam portions 29 from the recesses 30 in the sleeve 17. When the valve is taken to one extreme setting, one control plate 56 is unblocked so permitting the associated lock member 25 to be turned and the associated key released from the main body; conversely at the other extreme setting the other key may be removed following locking of the mechanism. The provision of the slots 15 engaged by the pins 13 in the main body give limited backlash between the drive member and the main body: after taking the valve to its extreme setting the main body may be moved back slightly until locking can be completed by engaging the appropriate lock member cam portion 29 in the nearest recess 30 in the sleeve 17.

Figure 2:
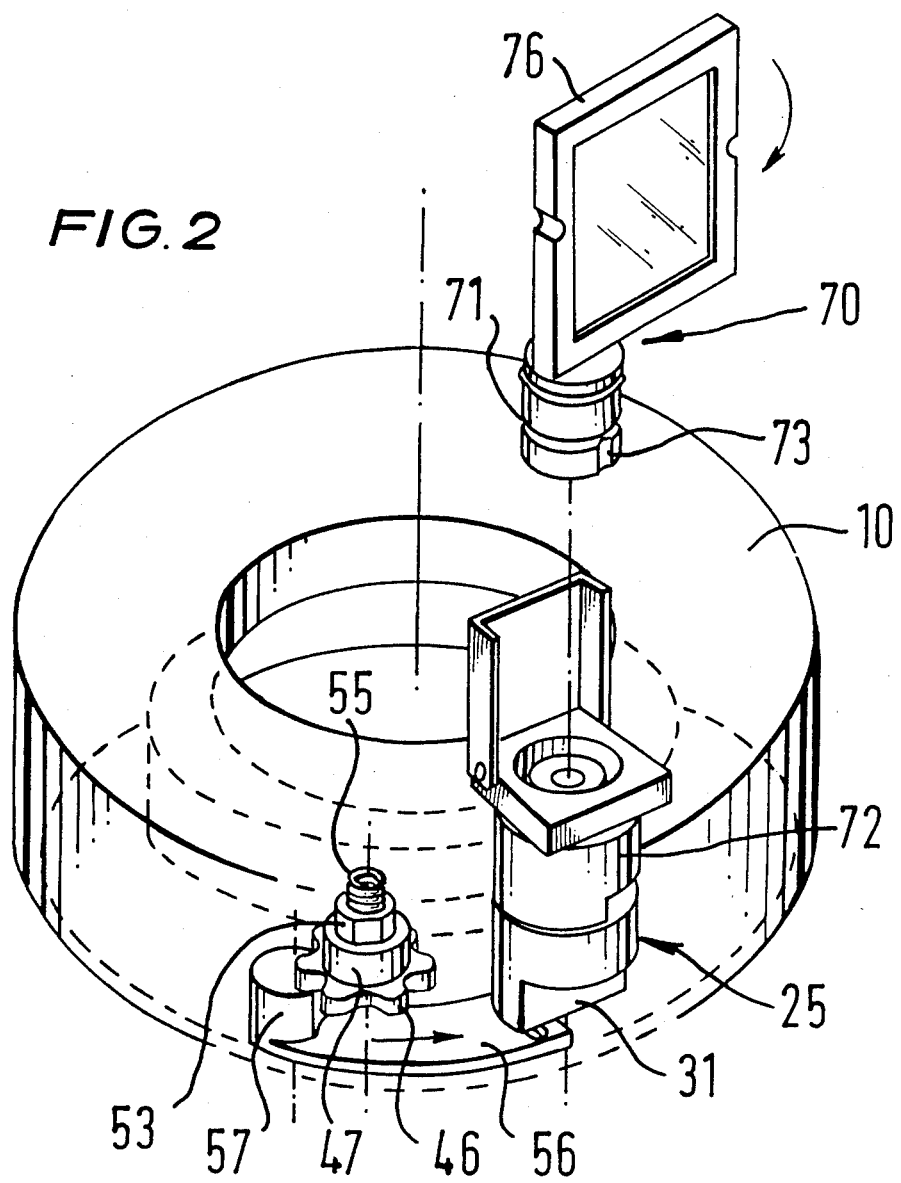
FIG. 2 is a diagrammatic perspective view of certain parts of a lock mechanism embodying similar principles to those of the interlock mechanism of FIG. 1, but with a different key arrangement.
Figure 3:
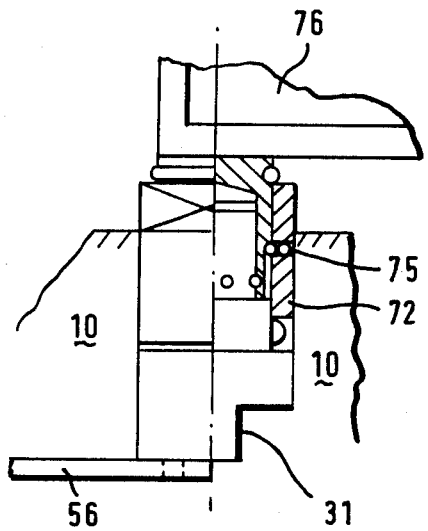
FIG. 3 is a detail cross-section through the lock mechanism of FIG. 2.

FIGS. 2 and 3 show in part a modified form of the interlock mechanism described above, and like parts are given like reference characters: these parts will not be described again here. In this modified form, the key 70 has an annular groove 71 formed around its external surface which is received within a key-entry component 72 pressed into the main body 10, a slot 73 extending along the key outer surface parallel to the key axis from the key end face 74 to the groove 71. Two balls 75 are press-fitted into a hole in the component 72 so that the inner ball projects into the bore of the component, so that the key may be fitted into the component 72 or removed therefrom only when the slot 73 is aligned with the projecting ball. Once a key has been entered fully and turned to operate a lock member 25, key removal is prevented by the projecting ball, located in groove 71.

Also shown in FIGS. 2 and 3 is a different handle arrangement for the key 70; this handle arrangement comprises a frame 76 in which may be located a sheet of identifying material, for instance carrying suitable wording or numbering. Such a sheet also may be coloured, as required, to suit any given installation.

Though only one lock member and associated components are shown in FIG. 2, it will be appreciated that the overall interlock mechanism should have a pair of similar arrangements, as shown in FIG. 1. If however the mechanism is to serve as a simple lock, to secure a valve at one extreme setting only, then the mechanism could have just a single lock member and associated components, as illustrated.

It will be appreciated that the interlock mechanisms described above are extremely compact as compared to known prior art mechanisms and moreover may be adjusted with great facility to suit the required number of turns needed to take a valve from one extreme setting to the other, without the need to perform any internal machining or other modifications.

I claim:

1. A lock mechanism for a rotatable stub projecting from a machine element, which mechanism comprises:
   a drive member associated with said rotatable stub;
   a sleeve surrounding said drive member and held against rotation with respect to said machine element;
   a main body adapted for rotation with respect to said machine element and connected to said drive member to effect rotation thereof;
   lock means comprising a lock member mounted in said main body and movable between a first position in which said lock member is engaged with said sleeve so as to prevent rotation of the main body and a second position in which said lock member is free of said sleeve;
   key means engageable with said lock member for moving the lock member between its two said positions;
   stop means associated with the lock means to prevent operation of said lock member by the key means other than when said drive member is at a predetermined setting, which stop means comprises:
   a toothed wheel rotatably mounted in the main body for cooperation with said sleeve whereby the toothed wheel is turned as the main body is rotated;
   a control member mounted on the main body to control movement of said lock member; and
   a stop member which is moved into or out of engagement with said control member by turning movement of said toothed wheel; and
   the arrangement being such that as said drive member is turned away from said predetermined setting, said toothed wheel also is turned from its position at said predetermined setting to cause said stop member to engage said control member so inhibiting use of the key means to effect movement of said lock member.

2. A lock mechanism according to claim 1, in which holding means are provided to hold captive said key means within the main body other than when said lock member has been engaged with said sleeve so as to prevent rotation of the main body.

3. A lock mechanism according to claim 1, in which said toothed wheel is arranged for intermittent movement as said main body is rotated to turn said drive member.

4. A lock mechanism according to claim 3, in which an abutment is provided on said sleeve, and upon rotation of said main body the locus of a portion of the periphery of said toothed wheel intersects said abutment so that toothed wheel is advanced by one tooth each time said toothed wheel passes the abutment.

5. A lock mechanism according to claim 1, in which screw-threaded means are associated with said stop member to effect said movement thereof when acted on by said turning motion of said toothed wheel.

6. A lock mechanism according to claim 5, in which said toothed wheel having a bore is mounted within said main body and is held against axial movement, an internally screw-threaded bush is disposed within said bore of the toothed wheel which bush is slidable axially but held against rotation with respect to the toothed wheel, and a screw-threaded pin is fixed within the main body and is engaged with said screw-threaded bush, the said bush serving as a stop member.

7. A lock mechanism according to claim 1 in which said lock member is formed as a cam having a lobe, and said sleeve has at least one recess in which said lobe may be received on turning of said cam when said sleeve and said main body have an appropriate relative disposition.

8. A lock mechanism according to claim 1, in which said lock member is rotatably mounted in said main body for movement between its two positions, and said control member is mounted in the main body for sliding movement in a plane generally perpendicular to the axis of rotation of said lock member.

9. A lock mechanism according to claim 8, in which said lock member has an eccentric portion and said control member has a slot in which said eccentric portion is engaged, so that rotation of said lock member causes the control member to move, said control member movement being blockable by said stop member on turning of said toothed wheel.

10. An interlock mechanism for a rotatable stub projecting from a machine element, which interlock mechanism comprises a lock mechanism according to claim 1 in combination with a second lock means and associated stop means mounted within said main body, which said second lock means and associated stop means are essentially similar to said lock means and associated stop means of said lock mechanism but said two stop means being arranged to operate in anti-phase to each other.

11. An interlock mechanism according to claim 10, in which each said stop means includes an independent screw-threaded connection which causes movement of said stop member upon rotation of the associated toothed wheel, said screw-threaded connection of one said stop means being right-handed and of the other said stop means being left-handed.

12. A mechanism according to claim 1, in which said lock member is mounted for rotating movement and said key means comprises a key which fits co-axially on to the lock member, the said and lock member having interengaging projections and recesses to prevent rotation of the lock member by any tool other than an approprately-formed key.

13. A mechanism according to claim 12, in which said key is held trapped within said main body other than when said lock member has been turned to a position where movement of said main body is inhibited.

14. A mechanism according to claim 1, wherein there is a drive connection between said main body and said drive member which said drive connection has arranged to have a limited amount of backlash between the main body and the drive member.

15. A lock mechanism for a rotatable stub projecting from a machine element, which mechanism comprises:
a drive member adapted for mounting on said rotatable stub;
a sleeve surrounding said drive member and held against rotation with respect to said machine element;
a main body adapted for rotation with respect to said machine element and drivingly connected to said drive member to effect rotation thereof, said drive connection having a limited amount of backlash between said main body and said drive member;
lock means comprising a lock member rotatably mounted in said main body and movable between a first position in which said lock member is engaged with said sleeve so as to prevent rotation of the main body and a second position in which said lock member is free of said sleeve;
key means engageable with said lock member for turning the lock member between its two said positions;
holding means to hold captive said key means within the main body other than when said lock member has been engaged with said sleeve so as to prevent rotation of the main body;
stop means associated with the lock means to prevent operation of said lock member by the key means other than when said drive member is at predetermined setting, which stop means comprises:
a toothed wheel rotatably mounted in the main body;
an abutment provided on said sleeve, which abutment is engaged by said toothed wheel on rotation of the main body so that said toothed wheel is advanced by one tooth each time said toothed wheel passes the abutment;
a control member mounted on the main body to control movement of said lock member;
a stop member; and
a screw-threaded means associated with said stop member to effect movement thereof into and out of engagement with said control member on turning movement of said toothed wheel.

16. In combination, a fluid flow control valve having an operating member requiring a plurality of turns to drive the valve from one extreme setting to the other, and an interlock mechanism which comprises:
a drive member associated with said valve operating member;
a sleeve surrounding said drive member and held against rotation with respect to said valve;
a main body adapted for rotation with respect to said valve and connected to said drive member to effect rotation thereof;
first lock means comprising a first lock member mounted in said main body and movable between a first position in which said first lock member is engaged with said sleeve so as to prevent rotation of the main body and a second position in which said first lock member is free of said sleeve;
first key means engageable with said first lock member for moving the first lock member between its two said positions;
first stop means associated with the first lock means to prevent operation of said first lock member by the first key means other than when said drive member is at a predetermined setting, which first stop means comprises:
a first toothed wheel rotatably mounted in the main body for cooperation with said sleeve whereby the first toothed wheel is turned as the main body is rotated;
a first control member mounted on the main body to control movement of said first lock member;
a first stop member which is moved into or out of engagement with said first control member by turning movement of said toothed wheel; and
second lock means and associated second stop means mounted within said main body, which said second lock means and associated second stop means are essentially similar to said first lock means and associated first stop means but said first and second stop means being arranged to operate in anti-phase to each other.

* * * * *